United States Patent
Ludwig et al.

(10) Patent No.: US 8,867,358 B2
(45) Date of Patent: Oct. 21, 2014

(54) ENERGY CONTROL IN A MOBILE COMMUNICATION NETWORK

(75) Inventors: Reiner Ludwig, Hürtgenwald (DE); Hannes Ekström, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 14 days.

(21) Appl. No.: 13/515,094

(22) PCT Filed: Dec. 23, 2009

(86) PCT No.: PCT/EP2009/067887
§ 371 (c)(1),
(2), (4) Date: Jul. 18, 2012

(87) PCT Pub. No.: WO2011/076282
PCT Pub. Date: Jun. 30, 2011

(65) Prior Publication Data
US 2012/0275367 A1    Nov. 1, 2012

(51) Int. Cl.
| | |
|---|---|
| H04L 12/26 | (2006.01) |
| H04L 12/851 | (2013.01) |
| H04L 12/825 | (2013.01) |
| H04W 28/10 | (2009.01) |
| H04W 52/02 | (2009.01) |
| H04L 12/24 | (2006.01) |
| H04L 12/801 | (2013.01) |

(52) U.S. Cl.
CPC .............. *H04W 28/10* (2013.01); *H04L 47/24* (2013.01); *H04L 47/25* (2013.01); *H04L 12/2439* (2013.01); *H04W 52/0258* (2013.01); *H04L 47/14* (2013.01)
USPC ..................................... 370/235; 370/395.21

(58) Field of Classification Search
CPC ................... H04W 28/0221; H04W 28/0257; H04W 28/0268; H04L 47/10; H04L 47/22; H04L 47/24
See application file for complete search history.

(56) References Cited

U.S. PATENT DOCUMENTS 6,957,071 B1 * 10/2005 Holur et al. ................ 455/452.2
8,339,982 B2   12/2012 Tynderfeldt et al.
(Continued)

FOREIGN PATENT DOCUMENTS

EP        2104275 A1    9/2009
JP      2006080915 A    3/2006
(Continued)

OTHER PUBLICATIONS

Ekstrom, H.; "QoS Control in the 3GPP Evolved Packet System", IEEE Communications Magazine, IEEE Service Center, Piscataway, US LNKD-DoI: 10.1109/MCOM.2009.4785383, vol. 47, No. 2, Feb. 1, 2009, pp. 76-83, XP011280742, ISSN: 0163-6084.

(Continued)

*Primary Examiner* — Chirag Shah
*Assistant Examiner* — Jenkey Van
(74) *Attorney, Agent, or Firm* — Coats & Bennett, PLLC (57) ABSTRACT

In a mobile communication network, data traffic of a certain quality of service class is forwarded in accordance with a traffic forwarding policy associated with this quality of service class, e.g. by establishing dedicated bearers (52, 54). For implementing energy control, an energy control attribute is assigned to the quality of service class. On the basis of the energy control attribute, a data throughput for forwarding the data traffic is limited to a maximum limit. This may be accomplished by using a throughput limiter (150, 250) in one or more nodes (100, 110, 120, 200) participating in the transport of the data traffic.

8 Claims, 6 Drawing Sheets

(56) References Cited

U.S. PATENT DOCUMENTS

| | | | |
|---|---|---|---|
| 2003/0016651 A1* | 1/2003 | Kwok et al. | 370/349 |
| 2003/0058871 A1* | 3/2003 | Sastry et al. | 370/401 |
| 2006/0205443 A1 | 9/2006 | Simoens et al. | |
| 2007/0259673 A1* | 11/2007 | Willars et al. | 455/453 |
| 2009/0310487 A1* | 12/2009 | Eriksson | 370/235 |

FOREIGN PATENT DOCUMENTS

| | | |
|---|---|---|
| JP | 2006524945 A | 11/2006 |
| JP | 2008072487 A | 3/2008 |
| WO | 2009090582 A1 | 7/2009 |

OTHER PUBLICATIONS

3rd Generatation Partnership Project, "Technical Specification Group Services and System Aspects; General Packet Radio Service (GPRS) enhancements for Evolved Universal Terrestrial Radio Access Network (E-UTRAN) access (Release 8)", Mar. 2008, 3GPP TS 23.401 V8.1.0.

* cited by examiner

FIG. 1

| QCI | Resource Type | Priority | Packet Delay Budget (PDB) | Packet Loss Rate (PLR) | Logical Channel Group (LCG) | DSCP mapping | Energy Control Attribute | |
|---|---|---|---|---|---|---|---|---|
| 1 | GBR | 2 | 100ms | $10^{-2}$ | 2 | EF | N/A | ... |
| 2 | | 4 | 150ms | $10^{-3}$ | 2 | EF | N/A | ... |
| 3 | | 5 | 300ms | $10^{-6}$ | 2 | EF | N/A | ... |
| 4 | | 3 | 50ms | $10^{-3}$ | 2 | EF | N/A | ... |
| 5 | Non-GBR | 1 | 100ms | $10^{-6}$ | 1 | CS5 | x | ... |
| 6 | | 7 | 100ms | $10^{-3}$ | 3 | AF2 | x | ... |
| 7 | | 6 | 300ms | $10^{-6}$ | 3 | AF2 | y | ... |
| 8 | | 8 | 300ms | | 3 | AF2 | y | ... |
| 9 | Non-GBR | 9 | 300ms | $10^{-6}$ | 3 | AF2 | z | ... |
| 10 | | 10 | 300ms | $10^{-5}$ | 4 | AF2 | ... | ... |
| ... | | | | | | | | |
| N | | | | | | | | |

ENERGY CONTROL IN A MOBILE COMMUNICATION NETWORK

TECHNICAL FIELD

The present invention relates to techniques for energy control in a mobile communication network.

BACKGROUND

In recent years, there has been increasing interest in reducing power consumption of electronic equipment, e.g. communication devices such as in a mobile communication network. Reducing the power consumption not only allows for saving costs, but also is beneficial from an environmental point of view, since it helps to reduce carbon emissions.

Accordingly, there is a need for techniques which allow for reducing power consumption in a mobile communication network.

SUMMARY

According to an embodiment of the invention, a method of energy control in a mobile communication network is provided. The method comprises forwarding data traffic of at least one quality of service class in accordance with a traffic forwarding policy associated with the at least one quality of service class. On the basis of an energy control attribute assigned to the at least one quality of service class, a data throughput for forwarding of the data traffic is limited to a maximum limit.

According to a further embodiment of the invention, a network component is provided. The network component comprises a network node configured to accomplish forwarding of data traffic of at least one quality of service class from and/or to one or more mobile terminals in accordance with a traffic forwarding policy associated with the at least one quality of service class. The network component further comprises a throughput limiter configured to limit, on the basis of an energy control attribute assigned to the at least one quality of service class, a data throughput for forwarding of the data traffic to a maximum limit.

According to a further embodiment of the invention, a mobile terminal is provided. The mobile terminal comprises a traffic flow controller configured to accomplish forwarding of data traffic of a quality of at least one service class from and/or to a network node in accordance with a traffic forwarding policy associated with the at least one quality of service class. The mobile terminal further comprises a throughput limiter configured to limit, on the basis of an energy control attribute assigned to the at least one quality of service class, a data throughput for forwarding of the data traffic to a maximum limit.

DETAILED DESCRIPTION OF EMBODIMENTS

In the following, the invention will be explained in more detail by referring to exemplary embodiments and to the accompanying drawings. The illustrated embodiments relate to energy control techniques in a mobile communication network, e.g. according to the 3GPP ($3^{rd}$ Generation Partnership Project) technical specifications. However, it is to be understood that concepts as described herein may be applied to other types of communication networks as well.

Figure 1:
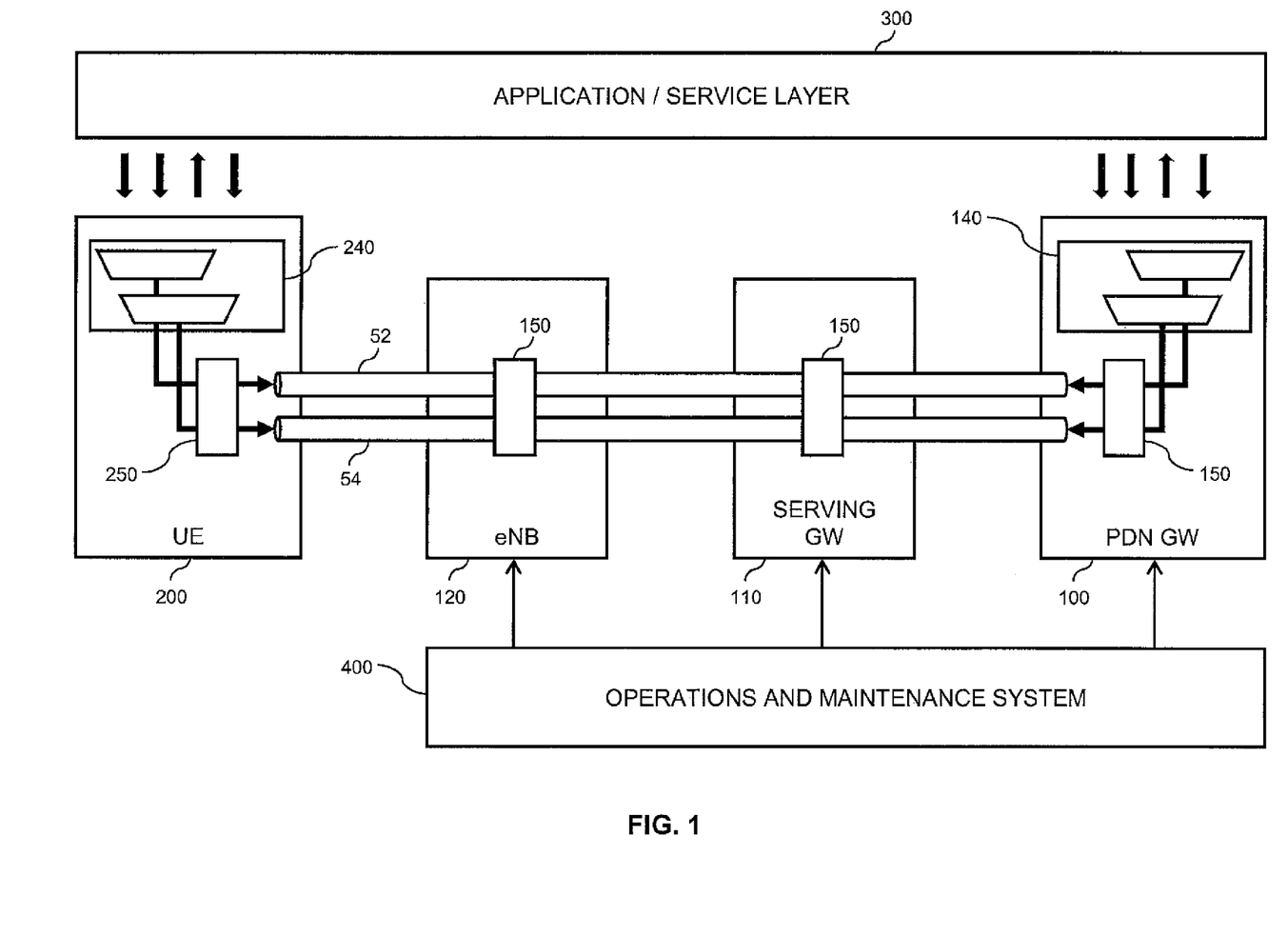
FIG. 1 schematically illustrates a mobile communication network environment in which energy control according to embodiments of the invention may be implemented.

FIG. 1 schematically illustrates a mobile communication network environment in which energy control is implemented in accordance with an embodiment of the invention.

The mobile communication network environment comprises a mobile terminal 200 and a number of network components 100, 110, 120. Moreover, FIG. 1 schematically shows an application/service layer 300 in which various types of applications and/or services may be implemented, e.g. IMS telephony (IMS: Internet Protocol Multimedia Subsystem), peer-to-peer file sharing, or the like. In addition, FIG. 1 illustrates an Operations and Maintenance (O&M) system 400, which allows the network operator to control operation parameters of the network components 100, 110, 120 and of the mobile terminal 200.

The network components as illustrated in FIG. 1 comprise a gateway node 100, an intermediate gateway node 110, and an access node 120. The mobile terminal 200 may be a mobile phone, a portable computer, or other type of user equipment (UE). In the illustrated example the gateway node 100 is a packet data network (PDN) gateway according to the 3GPP technical specifications, the intermediate gateway node 110 is a Serving Gateway according to the 3GPP technical specifications, and the access node 120 is an eNodeB according to the 3GPP technical specifications. However, it is to be understood that other types of mobile terminals or network components may be used as well.

As further illustrated in FIG. 1, bearers 52, 54 may be established between the mobile is terminal 200 and the gateway node 100. Each of the bearers 52, 54 may carry downlink data traffic from the gateway node 100 to the mobile terminal 200 and/or uplink data traffic from the mobile terminal 200 to the gateway node 100. In the gateway node 100, the downlink data traffic is mapped to the bearers 52, 54 by a downlink data flow controller 140. This mapping is controlled in accordance with the type of data traffic. That is to say, data traffic of a certain type, e.g. data traffic related to a specific service or application, will be mapped to a corresponding one of the bearers 52, 54. Similarly, in the mobile terminal 200 uplink data traffic is mapped to the bearers 52, 54 by an uplink data flow controller 240. Again, data traffic of a certain type, e.g. data traffic related to a specific service or application, will be mapped to a corresponding one of the bearers 52, 54. For example, the bearer 52 as illustrated in FIG. 1 may carry signalling data, e.g. SIP signalling data (SIP: Session Initiation Protocol), and the bearer 54 may carry packetized voice data, e.g. IMS-VoIP data (VoIP: Voice over Internet Protocol).

The bearers 52, 54 ensure that the data traffic mapped thereto gets the resources it requires in terms of quality of service (QoS). In particular, each of the bearers 52, 54 is associated with a corresponding QoS class. According to an embodiment, the QoS class may be identified by a QoS class identifier (QCI) as defined in the 3GPP technical specification 23.401. The QCI may be used as a reference to a predefined data forwarding policy and may be a scalar value between 1 and 256.

Accordingly, in the communication network environment as illustrated in FIG. 1, data traffic may belong to different QoS classes, and in each of the illustrated nodes 100, 110, 120, 200 the data traffic may be forwarded in accordance with a traffic forwarding policy associated with the respective QoS class of the data traffic. In this respect, it is to be understood that a QCI is one way of identifying a QoS class and that other ways to define QoS classes may be used as well, e.g. using a DSCP (Differentiated Services Code Point) included in a header section of data packets transmitted between different network components. According to some embodiments, both QCIs and DCPs may be used to identify QoS classes, and a mapping of QCIs to DSCP values may be provided, e.g. by the network operator through the O&M system 400. Moreover, other types of QoS classes may be used as well, depending on the type of mobile communication network. For example, in some mobile communication networks QoS classes may be defined in terms of different traffic classes, such as "conversational", "streaming", "interactive", and "background". However, for the sake of clarity, the following description will focus on embodiments in which a QoS class is identified by a QCI. According to these examples, the bearer 52 may be used to transport data traffic of one QoS class, e.g. with QCI 5, and the bearer 54 may be used to transport data traffic of another QoS class, e.g. with QCI 7.

According to the concepts of energy control as described herein, each node participating in the forwarding of data traffic, i.e. the mobile terminal 200, the access node 120, the intermediate gateway node 110, the gateway node 100, or any other type of network node participating in the data transport, may be provided with a capability to limit the aggregate amount of served, i.e. forwarded, data traffic on a per QoS class basis. This limitation in turn allows for controlling the aggregate power consumed by processing the data traffic of a certain QoS class. In particular, an energy control attribute may be assigned to one or more QoS classes, which is used as a basis for limiting a data throughput for forwarding of the data traffic of this QoS class or those QoS classes to a maximum limit. The data throughput may be defined in terms of bandwidth used for forwarding the data traffic, e.g. in terms of data symbols, bits, or bytes per unit time.

For the purpose of limiting the data throughput, each of the nodes participating in the transport of data traffic as illustrated in FIG. 1 may be provided with a throughput limiter 150, 250. Here, it is to be understood that in FIG. 1 a throughput limiter 150 is illustrated in each of the network components 100, 110, 120, and a is throughput limiter 250 is illustrated in the mobile terminal 200. However, in some embodiments only one node participating in the transport of the data traffic, e.g. the access node 120 or the gateway node 100, may be provided with the illustrated throughput limiter. The throughput limiter 150, 250 may be implemented by a computer program to be executed by a processor or may be implemented by dedicated hardware components. According to some embodiments, the throughput limiter 150, 250 may be implemented as a sub-module of a scheduling algorithm used for forwarding data traffic and for allocating resources between different QoS classes. In other embodiments, the throughput limiter may be implemented separately from such scheduling algorithms. In addition, it is to be understood that further network nodes, which are not illustrated in FIG. 1, e.g. transport nodes, may be provided with such a throughput limiter as well.

As mentioned above, the throughput limiter 150, 250 is configured to limit, on the basis of the energy control attribute assigned to the QoS class, the data throughput for forwarding the data traffic of this QoS class to a maximum limit. The data traffic subjected to the limitation of the data throughput may be in the uplink direction and/or in the downlink direction, i.e. may be from the mobile terminal 200 and/or to the mobile terminal 200. The maximum limit may be determined by the network operator, e.g. by supplying corresponding control signals to the network components 100, 110, 120 using the O&M system 400. For the throughput limiter 250 in the mobile terminal 200, the maximum limit may be configured by the network operator as well, e.g. via the access node 120 and a radio link between the access node 120 and the mobile terminal 200. In addition or as an alternative, the maximum limit of the throughput limiter 250 in the mobile terminal 200 may also be configured by a user of the mobile terminal 200. Accordingly, different types of control interfaces may be used for configuring the throughput limiter 150, 250. The type of control interface will typically depend on the type of node comprising the throughput limiter 150, 250.

Accordingly, in some embodiments control information with respect to the energy is control attribute is received from the O&M system 400. This control information may define a value of the maximum limit and/or may define a type of the maximum limit, e.g. whether the maximum limit is defined as a maximum fraction of a total data throughput capacity, as an absolute data throughput value, or as a maximum fraction of a total maximum power consumption.

According to some embodiments, the maximum limit may depend on a number of mobile terminals communicating the data traffic of the QoS class subject to throughput limitation with the access node 120. For example, a larger maximum limit may be selected for a larger number of mobile terminals communicating the data traffic with the access node 120.

According to some embodiments, the data throughput limitation is applied to QoS classes without guaranteed bit rate, e.g. QoS classes associated with QCI other than 1-4. For QoS classes with guaranteed bit rate, e.g. QoS class with QCIs between 5 and 9, limitation of the data throughput may not be desirable. Nonetheless, limitation of the data throughput of QoS classes with guaranteed bit rate is conceivable as well.

Figure 2:
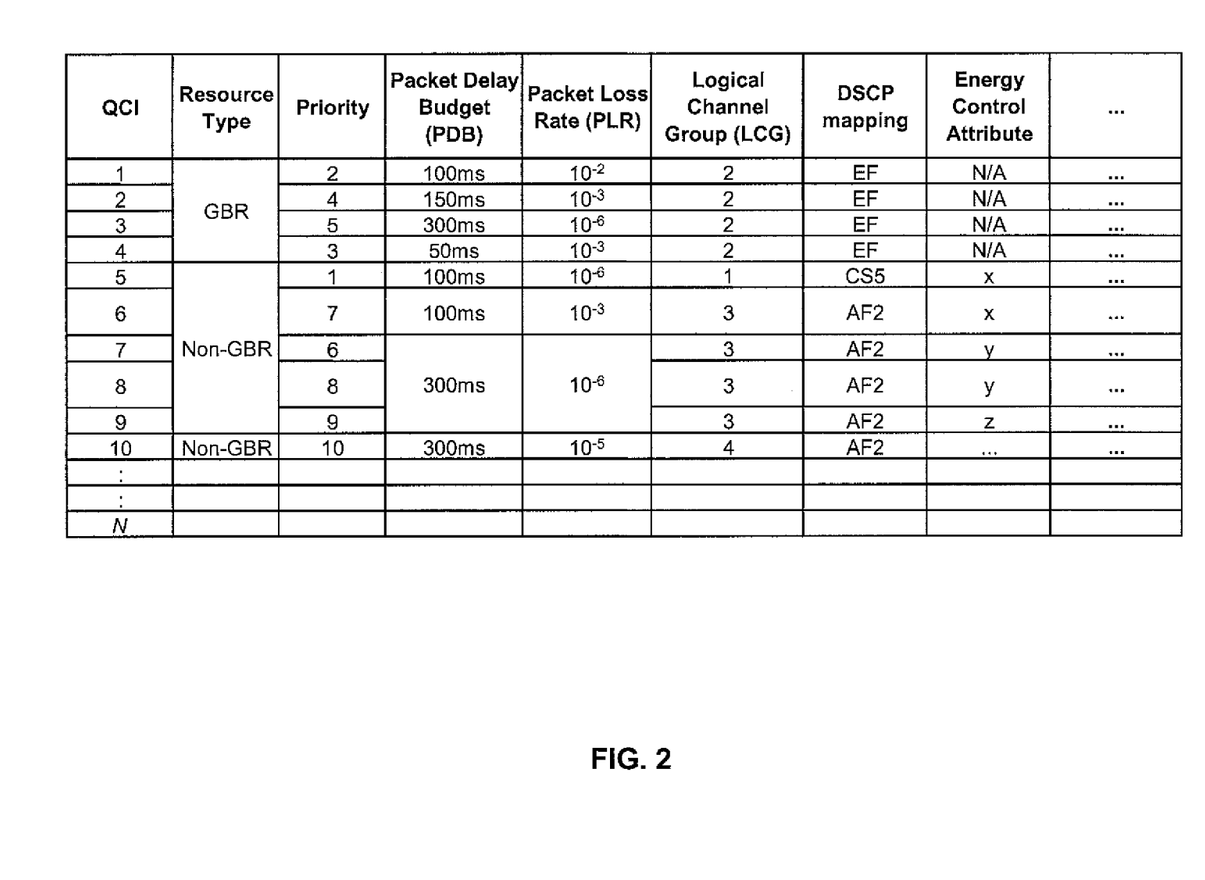
FIG. 2 shows an exemplary table with parameters of different quality of service classes.

FIG. 2 schematically illustrates a QCI table which may be used in a mobile communication network according to an embodiment of the invention for implementing concepts of energy control as outlined above. The QCI table is typically provided by the network operator using the O&M system 400.

The columns will be explained starting from the left-most column and advancing to the right. In the left-most column, QCI values are shown, each of which define a different QoS class. The next column defines a resource type. As can be seen, QCIs 1-4 are guaranteed bit rate (GBR) QoS classes, whereas QCIs 5-9 are non-GBR QoS classes.

The next column defines a priority of the QoS class, which may be used in scheduling algorithms for resource arbitration. A lower value indicates a higher priority. As can be seen, in the illustrated exemplary table, the QoS class with QCI 5 is provided with the highest priority.

The next column defines a packet delay budget, i.e. a maximum delay a data packet may experience during transmission between the gateway node 100 and the mobile terminal 200.

The next columns define an allowable packet loss rate, a logical channel group, and a mapping of the QoS class to DSCP values. In the DSCP mapping column, "ES" indicates an expedited forwarding behaviour as defined in RSC 3246, "AF" indicates an assured forwarding class as defined in RFC 2597, and "CS" indicates a class selector type forwarding behaviour as defined in RFC 2475.

The next column is used to define the energy control attribute. As can be seen, for QCIs 1-4, which are GBR QoS classes, no energy control attribute is assigned (indicated by N/A). This reflects that typically a network operator will not want to limit the data throughput of GBR data traffic. To QCI 5 and 6, and energy control attribute "x" is assigned, to QCI 7 and 8, an energy control attribute "y" is assigned, and to QCI 9, an energy control attribute "z" is assigned. In this respect, it is to be understood that the energy control attribute "x", "y", and "z" may actually be a reference to a set of energy control parameters, such as a maximum limit value or a type of maximum limit. Also, it is to be understood that an arbitrary number of different energy control attributes could be defined and assigned to different QoS classes as appropriate.

Figure 3:
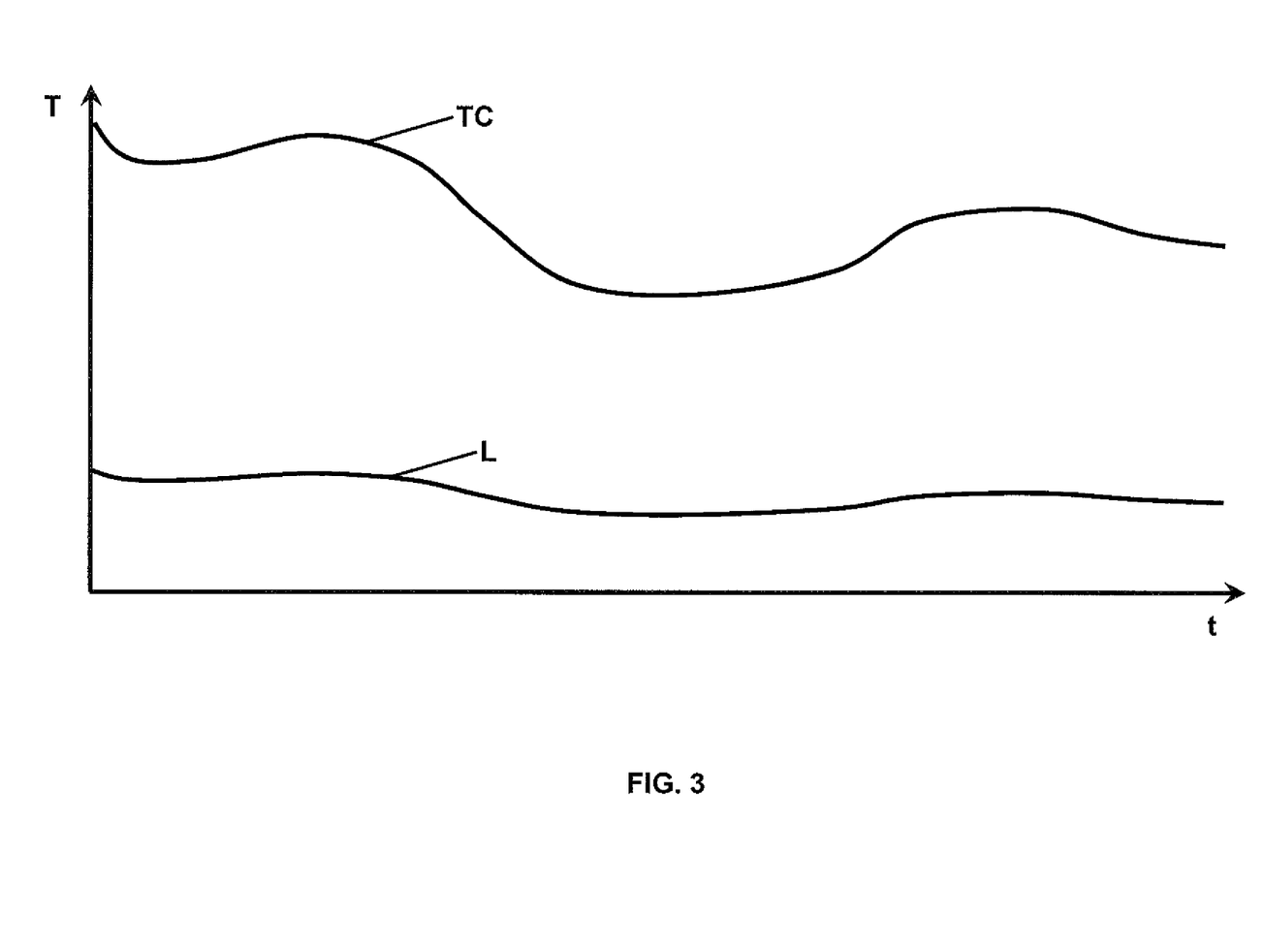
FIG. 3 shows an exemplary scenario according to an embodiment of the invention, in which the data throughput is limited to a maximum fraction of a total throughput.
Figure 4:
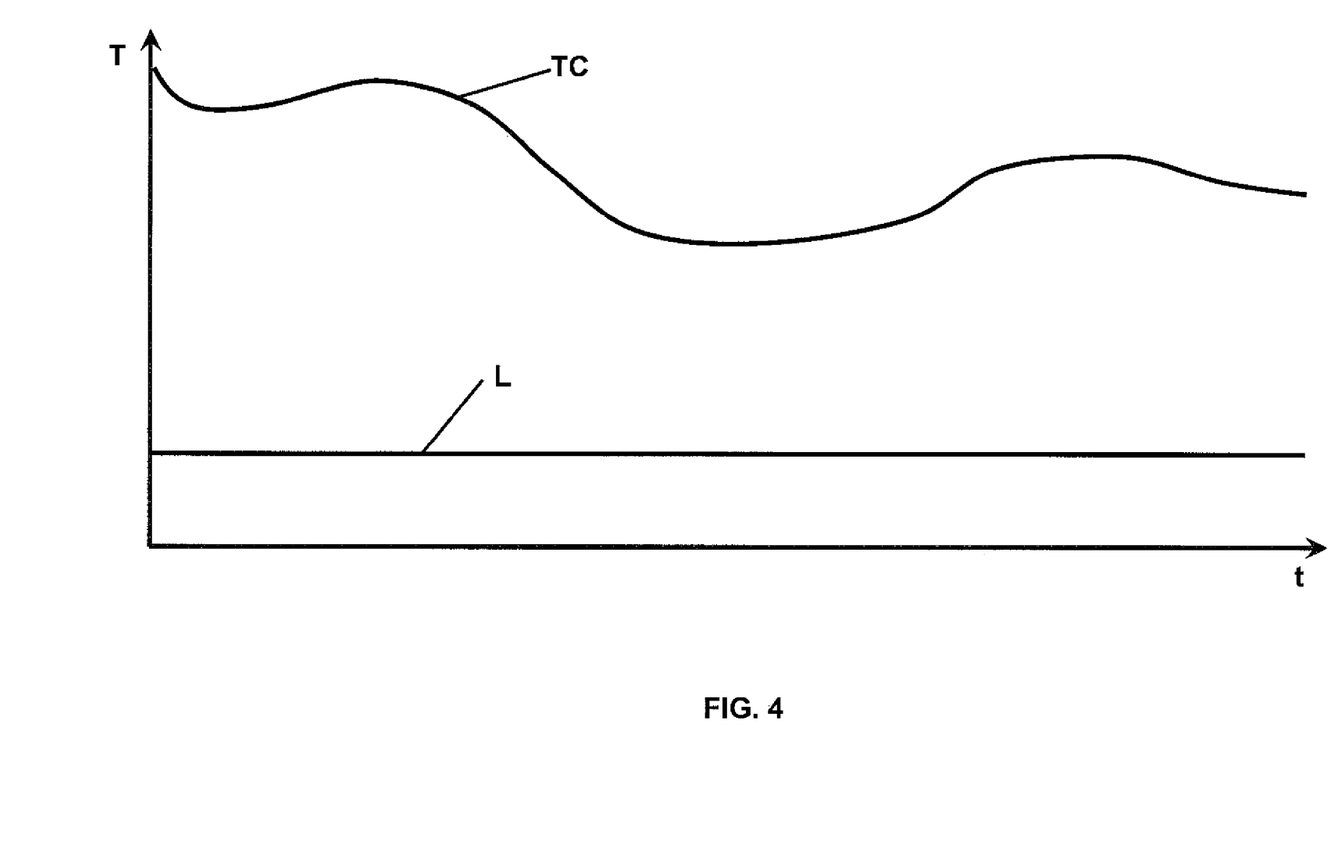
FIG. 4 shows an exemplary scenario according to an embodiment of the invention, in which the data throughput is limited to a maximum absolute throughput value.
Figure 5:
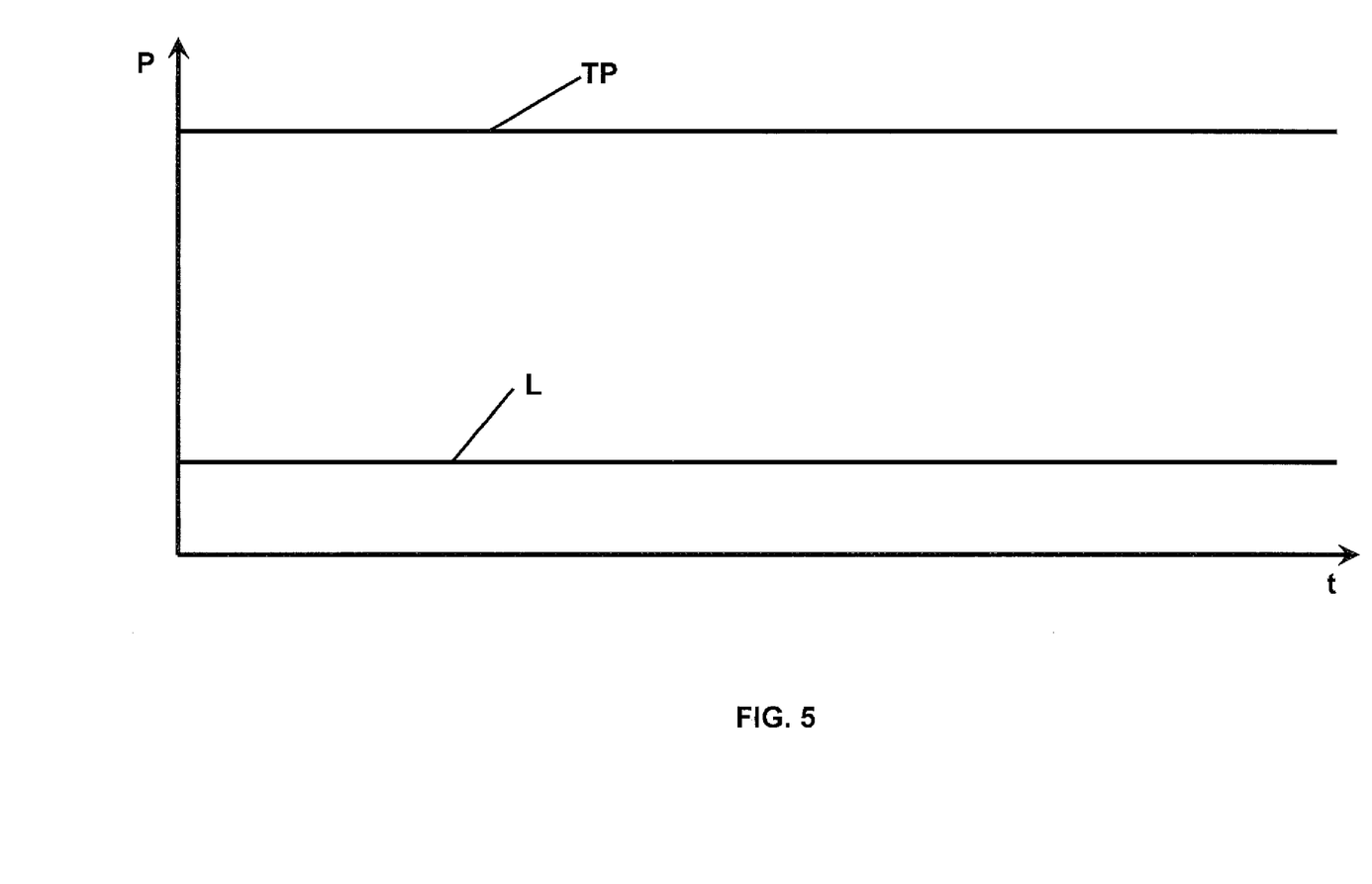
FIG. 5 shows an exemplary scenario according to an embodiment of the invention, in which the data throughput is limited to a maximum fraction of a total maximum power consumption.

In the following, options of defining the maximum limit of the energy control attribute will be explained with respect to exemplary situations as illustrated in FIGS. 3-5.

The situation as illustrated in FIG. 3 relates to an embodiment in which the maximum limit is defined as a maximum fraction of a total data throughput capacity. The total data throughput capacity refers to a capacity available for forwarding the data traffic of the QoS class to which the energy control attribute is assigned and typically also for forwarding data traffic of one or more other QoS classes. The total data throughput capacity may be defined on a level of one or more cells of the mobile communication network, i.e. may be a total data throughput capacity of the cell or of a plurality of cells. Alternatively, the total data throughput capacity may be defined on a network node level, i.e. may be a total data throughput capacity available in the network node. Such a node may be any of the above-discussed nodes participating in the transport of the data traffic, e.g. the access node 120, the intermediate gateway node 110, the gateway node 100, or the mobile terminal 200 as illustrated in FIG. 1. In this respect, it is also to be noted that the node for which the total data throughput capacity is defined may be different from or the same as that in which the limitation of the data throughput is implemented.

In FIG. 3, the maximum limit of the data throughput, denoted by L, and the total data throughput capacity, denoted by TC, are illustrated as a function of time, denoted by t. As can be seen, the total data throughput capacity varies with time, which may be due to variations of available resources, location changes of mobile terminals, or changes in transmission conditions. The maximum limit is defined as a fraction of the total throughput capacity, e.g. 20%, and varies in the same manner.

In FIG. 3, the area between the line L and the t-axis is the data throughput capacity available for forwarding data traffic of the QoS class to which the energy control attribute is assigned. The area between the line TC and the line L is the data throughput capacity available for forwarding of other data traffic, e.g. data traffic of is other QoS classes. In both regions, it is not necessary that all capacity is actually used, i.e. there may be idle capacities.

When defining the maximum limit as a maximum fraction of a total data throughput capacity not more than the given fraction of the total data throughput capacity will be allocated to the data traffic of the QoS class associated with the energy control attribute.

In FIG. 4, a situation is illustrated which relates to an embodiment in which the maximum limit is defined as an absolute data throughput value. The absolute data throughput value can be defined as a bandwidth, e.g. in units of bits per second, or the like.

In FIG. 4, the total data throughput capacity is again denoted by TC and varies in the same manner as shown in FIG. 3. The maximum limit is again denoted by L.

However, as compared to FIG. 3, the maximum limit is a constant value and independent of the variations of the total data throughput capacity.

When defining the maximum limit as an absolute data throughput value, the data traffic of the QoS class to which the energy control attribute is assigned will not experience a data throughput which is higher than the absolute data throughput value of the maximum limit.

FIG. 5 shows a situation which relates to embodiments in which the maximum limit is defined as a maximum fraction of a maximum total power consumption. The maximum total power consumption may be defined as a maximum total power consumption due to forwarding the data traffic of the QoS class to which the energy control attribute is assigned and typically also due to forwarding data traffic of one or more other QoS classes. The total power consumption may be defined on the level of one or more cells of the mobile communication network, i.e. may be a total power consumption in the cell or in a plurality of cells. Alternatively, the total power consumption may also be defined on the level of a node of the mobile communication network, i.e. may be a total power consumption in the node. This node may be any of the above-discussed nodes participating in the transport of the data traffic, e.g. the access node 120, the intermediate gateway node 110, the gateway node 100, or the mobile terminal 200 as illustrated in FIG. 1. It is to be noted that the node used to define the total power consumption may be different from or the same as that in which the limitation of the data throughput is implemented.

In FIG. 5, the maximum total power consumption, denoted by TP, and the maximum limit, denoted by L, are shown as a function of time, denoted by t. The maximum total power consumption is shown to be substantially constant. However, it is also possible that the maximum total power consumption varies as a function of time. For example, an increased maximum total power consumption may be temporarily allowed by the network operator during phases of high network load.

In FIG. 5, the region between the line L and the t-axis is the power available to be used by the data traffic of the QoS class to which the energy control attribute is assigned, whereas the region between the line TP and the line L is the power available to be used by other data traffic, e.g. data traffic of other QoS classes. In both regions, there may be unused power budgets.

When defining the maximum limit as a maximum fraction of a maximum total power consumption, not more than the given fraction of the maximum total power consumption will be allocated to the data traffic of the QoS class to which the energy control attribute is assigned. When defining the maximum limit as a maximum fraction of a maximum total power consumption, the reduction in power consumption is more or less directly given by the maximum limit. The data throughput of this QoS class may be adapted in such a manner that the power consumption due to this QoS class is kept below the selected maximum limit.

In the concepts as explained above, power consumption is reduced by reducing the number of transmitted symbols. If, for example, the same power is used for transmitting each data symbol of the data traffic on a radio link between the mobile terminal 200 and the access node 120, a reduction in the number of transmitted data symbols will proportionally translate to a reduction in power consumption. Similarly, a reduction in power consumption will also be obtained when data symbols are transmitted with different powers. In addition, limitation of the data throughput may also allow for using a lower order modulation for transmitting the data symbols on the radio link, which in turn allows for using a lower power per transmitted data symbol.

According to an example, if each data symbol is transmitted by the access node 120 with the same power, and the reduction in the number of transmitted symbols is 90%, then the corresponding power reduction in the access node 120 will be at least 90%. Additional power savings can be obtained when considering that auxiliary equipment, such as cooling systems in the access node 120, e.g. fans or air conditioning, may be operated at reduced power as well.

Figure 6:
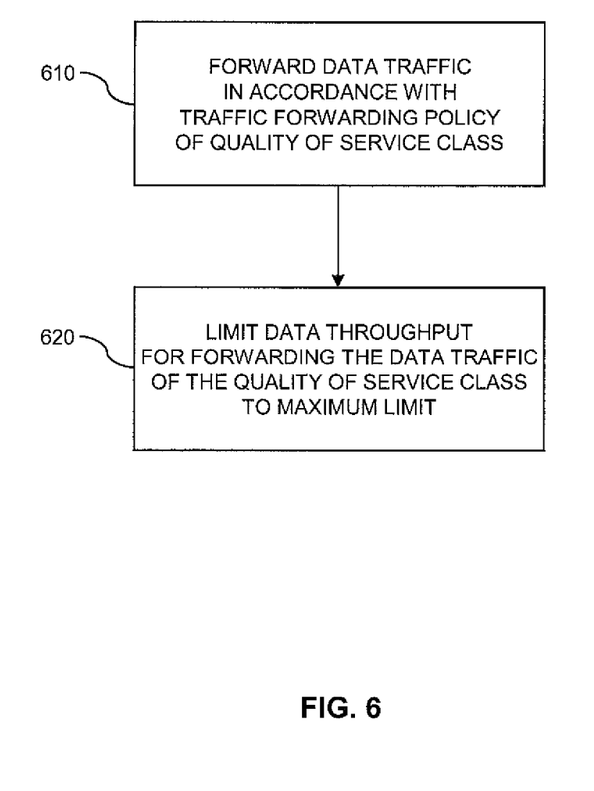
FIG. 6 shows a flowchart for schematically illustrating a method of energy control according to an embodiment of the invention.

FIG. 6 shows a flowchart for schematically illustrating a method of energy control in accordance with the above-mentioned concepts. The method may be implemented in any of the above-discussed nodes participating in the transport of the data traffic, e.g. in the access node 120, the intermediate gateway node 110, the gateway node 100, or the mobile terminal 200 as illustrated in FIG. 1.

In step 610, data traffic of at least one QoS class is forwarded in accordance with a corresponding traffic forwarding policy of the QoS class. This QoS class may be defined on the basis of a QCI, in particular a non-GBR QCI. However, it is to be understood that other ways of defining a QoS class are possible as well. When forwarding the data traffic of multiple QoS classes, each QoS class will typically have its corresponding traffic forwarding policy.

An energy control attribute is assigned to the QoS class, which may be accomplished by the network operator, e.g. using the O&M system 400 as illustrated in FIG. 1 and/or a QCI table as illustrated in FIG. 2.

In step 620, the data throughput capacity for forwarding the data traffic of the at least one QoS class, to which the energy control attribute is assigned is limited to a maximum limit. This may be accomplished by the data throughput limiter 150, 250 as illustrated in FIG. 1. Different types of the maximum limit may be used. For example, the maximum limit may be defined as a maximum fraction of a total data throughput capacity, an absolute data throughput value, or a maximum fraction of a maximum total power consumption. The type of the maximum limit, the value of the maximum limit, and/or other energy control parameters may be defined by control information received from the O&M system 400. The maximum limit may apply to one QoS class or may apply to multiple QoS classes. In the latter case, the multiple QoS classes may share the data throughput capacities defined by the maximum limit.

Due to the limited data throughput of the QoS class to which the energy control attribute is assigned, a corresponding reduction in power consumption can be obtained. For example, power consumption for transmitting data symbols on the radio link between the access node 120 and the mobile terminal 200 may be reduced. In addition, power consumption due to processing or forwarding of the data traffic in other nodes may be reduced as well.

It is to be understood that the concepts as explained above are merely exemplary and susceptible to various modifications. For example, the above-mentioned options of defining the maximum limit value could be modified or even combined with each other. Further, it is to be understood that different types of throughput limiters could be used in different nodes participating in the transport of the data traffic. For example, throughput limiters in different nodes could use different values of the maximum limit and/or different types of the maximum limit. Further, the data throughput of uplink data traffic and the data throughput of downlink data traffic could be limited in different ways, e.g. using different values of the maximum limit and/or different types of the maximum limit. It is also possible that limitation of the data throughput on the basis of the energy control attribute is implemented only in the downlink direction, but not in the uplink direction, or vice versa. Further, the concepts as explained above may be applied in various types of mobile communication networks.

The invention claimed is:

1. A method of energy control in a mobile communication network, comprising:
forwarding data traffic of at least one quality of service class in accordance with a traffic forwarding policy associated with the at least one quality of service class, wherein the traffic forwarding policy comprises at least one quality of service class identifier for identifying the at least one quality of service class;
receiving control information with respect to an energy control attribute from an operations and maintenance system;
limiting a data throughput for the forwarding of the data traffic to a maximum limit based on the energy control attribute assigned to the at least one quality of service class;
wherein the control information defines a value of the maximum limit and a type of the maximum limit; and
wherein the maximum limit is defined by at least one of:
a maximum fraction of a total data throughput capacity;
an absolute maximum data throughput value;
a maximum fraction of a total maximum power consumption;
a maximum data throughput that depends on a number of mobile terminals communicating the data traffic of the at least one quality of service class with an access node of the mobile communication network.

2. The method of claim 1 wherein the data traffic is in at least one of an uplink direction and a downlink direction.

3. The method of claim 1:
further comprising forwarding data traffic of multiple quality of service classes in accordance with corresponding traffic forwarding policies respectively associated with the quality of service classes;
wherein the energy control attribute is assigned to the multiple quality of service classes.

4. The method of claim 1 wherein the quality of service class is associated with a non-guaranteed bitrate Quality of Service Class Identifier.

5. A network component comprising:
processing hardware configured to:
forward data traffic of at least one quality of service class from and/or to one or more mobile terminals in accordance with a traffic forwarding policy associated with the at least one quality of service class, wherein the traffic forwarding policy comprises at least one quality of service class identifier for identifying the at least one quality of service class;
receive control information with respect to an energy control attribute from an operations and maintenance system;
limit a data throughput for the forwarding of the data traffic to a maximum limit based on the energy control attribute assigned to the at least one quality of service class;
wherein the control information defines a value of the maximum limit and a type of the maximum limit;

wherein the maximum limit is defined by at least one of:
- a maximum fraction of a total data throughput capacity;
- an absolute data throughput value;
- a maximum fraction of a total maximum power consumption;
- a maximum data throughput that depends on a number of mobile terminals communicating the data traffic of the at least one quality of service class with an access node of the mobile communication network.

6. A mobile terminal, comprising:
processing hardware configured to:
- forward data traffic of at least one quality of service class from and/or to a network node in accordance with a traffic forwarding policy associated with the at least one quality of service class, wherein the traffic forwarding policy comprises at least one quality of service class identifier for identifying the at least one quality of service class;
- receive control information with respect to an energy control attribute from an operations and maintenance system;
- limit a data throughput for the forwarding of the data traffic to a maximum limit based on an energy control attribute assigned to the at least one quality of service class;
- wherein the control information defines a value of the maximum limit and a type of the maximum limit;
- wherein the maximum limit is defined by at least one of:
  - a maximum fraction of a total data throughput capacity;
  - an absolute data throughput value;
  - a maximum fraction of a total maximum power consumption;
  - a maximum data throughput that depends on a number of mobile terminals communicating the data traffic of the at least one quality of service class with an access node of the mobile communication network.

7. A computer program product stored in a non-transitory computer readable medium for controlling a control node in a mobile communication network, the computer program product comprising software instructions which, when run on the control node, causes the control node to:
- forward data traffic of at least one quality of service class in accordance with a traffic forwarding policy associated with the at least one quality of service class, wherein the traffic forwarding policy comprises at least one quality of service class identifier for identifying the at least one quality of service class;
- receive control information with respect to an energy control attribute from an operations and maintenance system;
- limit a data throughput for the forwarding of the data traffic to a maximum limit based on the energy control attribute assigned to the at least one quality of service class;
- wherein the control information defines a value of the maximum limit and a type of the maximum limit;
- wherein the maximum limit is defined by at least one of:
  - a maximum fraction of a total data throughput capacity;
  - an absolute maximum data throughput value;
  - a maximum fraction of a total maximum power consumption;
  - a maximum data throughput that depends on a number of mobile terminals communicating the data traffic of the at least one quality of service class with an access node of the mobile communication network.

8. A computer program product stored in a non-transitory computer readable medium for controlling a mobile terminal in a mobile communication network, the computer program product comprising software instructions which, when run on the mobile terminal, causes the mobile terminal to:
- forward data traffic of at least one quality of service class in accordance with a traffic forwarding policy associated with the at least one quality of service class, wherein the traffic forwarding policy comprises at least one quality of service class identifier for identifying the at least one quality of service class;
- receive control information with respect to an energy control attribute from an operations and maintenance system;
- limit a data throughput for the forwarding of the data traffic to a maximum limit based on the energy control attribute assigned to the at least one quality of service class;
- wherein the control information defines a value of the maximum limit and a type of the maximum limit;
- wherein the maximum limit is defined by at least one of:
  - a maximum fraction of a total data throughput capacity;
  - an absolute maximum data throughput value;
  - a maximum fraction of a total maximum power consumption;
  - a maximum data throughput that depends on a number of mobile terminals communicating the data traffic of the at least one quality of service class with an access node of the mobile communication network.

* * * * *

UNITED STATES PATENT AND TRADEMARK OFFICE
CERTIFICATE OF CORRECTION

| | |
|---|---|
| PATENT NO. | : 8,867,358 B2 |
| APPLICATION NO. | : 13/515094 |
| DATED | : October 21, 2014 |
| INVENTOR(S) | : Ludwig et al. |

Page 1 of 1

It is certified that error appears in the above-identified patent and that said Letters Patent is hereby corrected as shown below:

In The Specification

In Column 2, Line 46, delete "mobile is" and insert -- mobile --, therefor.

In Column 3, Line 54, delete "a is" and insert -- a --, therefor.

In Column 4, Line 25, delete "energy is" and insert -- energy --, therefor.

In Column 5, Line 58, delete "of is" and insert -- of --, therefor.

Signed and Sealed this
Ninth Day of June, 2015

Michelle K. Lee
*Director of the United States Patent and Trademark Office*